July 3, 1945.  W. B. ELMER  2,379,509
APPARATUS FOR HEATING AND COOKING
Filed Jan. 12, 1939  3 Sheets-Sheet 1
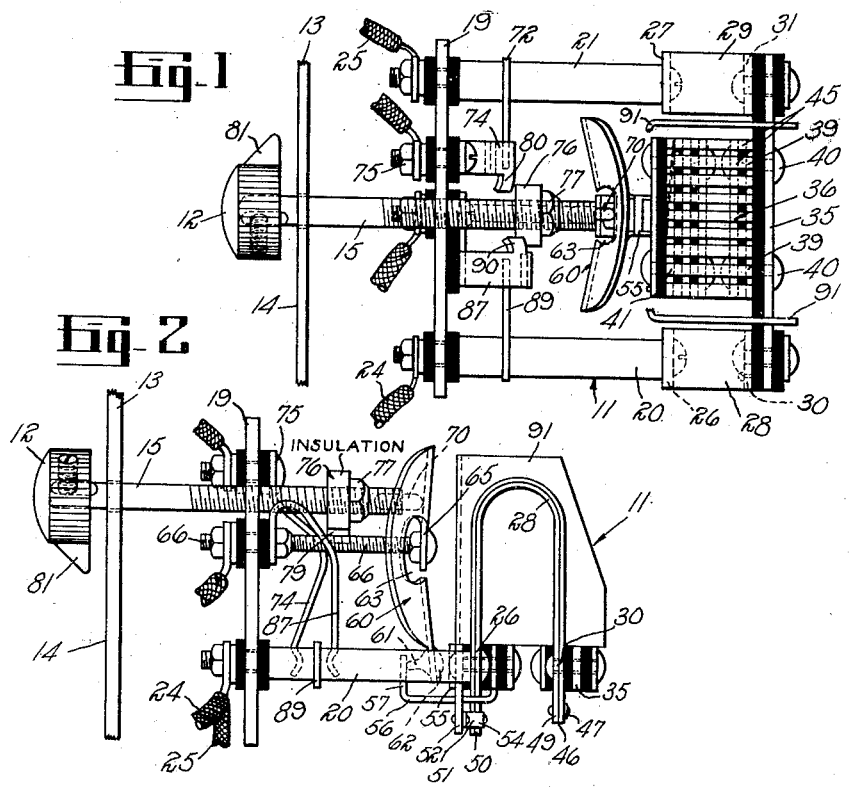
Inventor
WILLIAM B. ELMER
By T. Clay Lindsey
Attorney

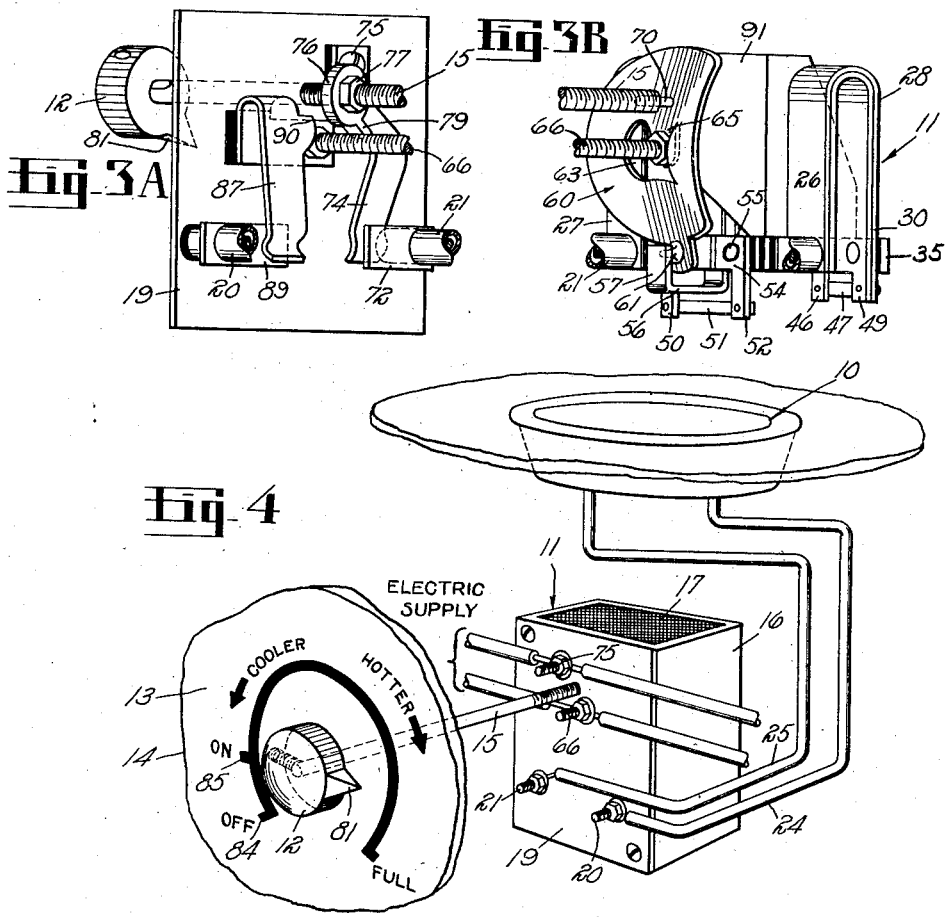

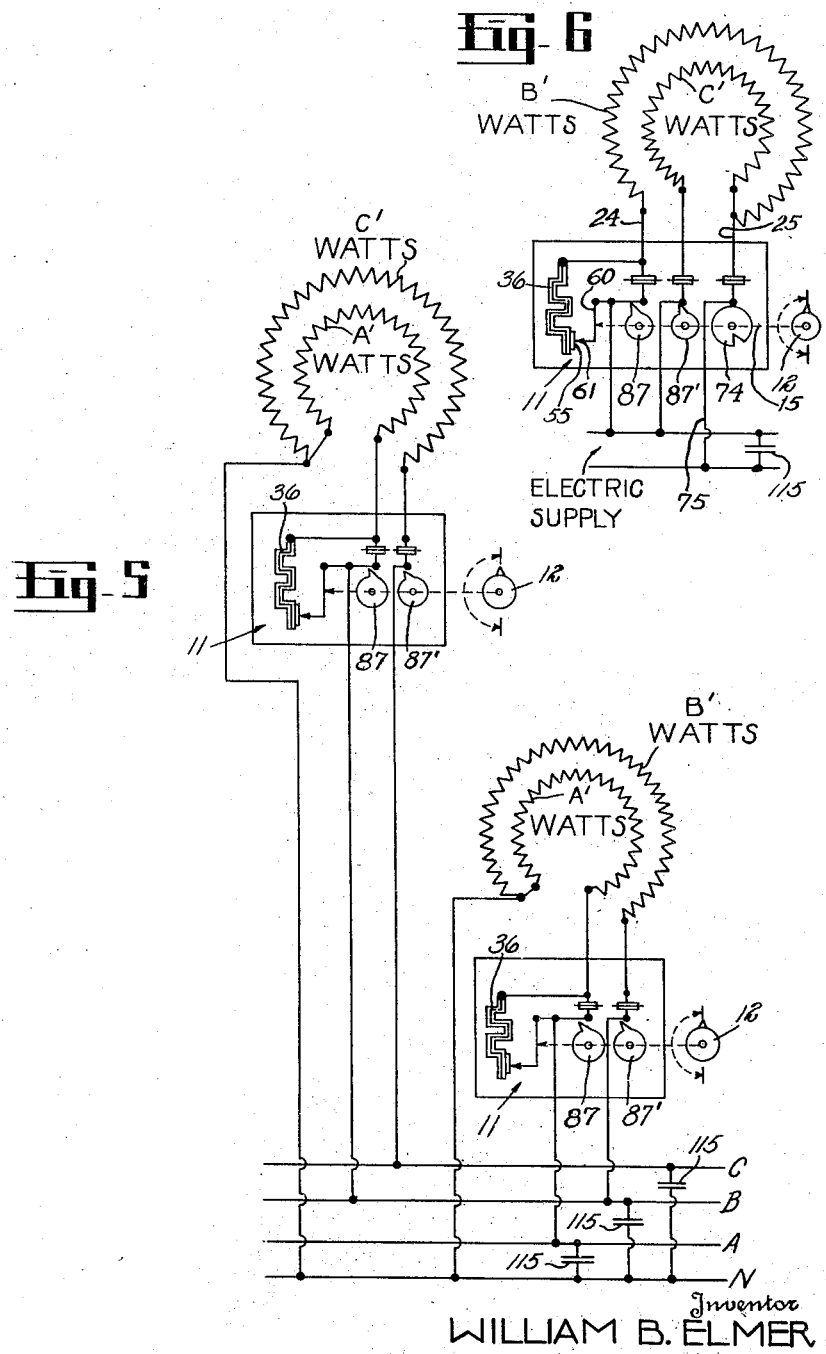

Patented July 3, 1945

2,379,509

UNITED STATES PATENT OFFICE 2,379,509

APPARATUS FOR HEATING AND COOKING

William B. Elmer, Winchester, Mass.

Application January 12, 1939, Serial No. 250,562

2 Claims. (Cl. 219—20)

The present invention relates to the control of electrical heating systems, and more particularly to an apparatus for controlling electrical heating systems used primarily for domestic stoves or ranges and the like.

Domestic electric stoves or ranges usually are provided with electrical heating units of the exposed or surface type over which pots, pans or other receptacles for containing food, or the like, are adapted to be placed. It has been common practice to control the heat emitted from such units by switches which connect the sources of electrical energy to the electrical resistance elements of the units in various combinations to obtain several heating stages. Generally, there have been provided but three predetermined settings, namely, "low," "medium" and "high," thus greatly limiting the selectivity with which the heating units may be controlled. It has also been the practice to use thermostatic temperature-responsive control devices for maintaining the heating units at a predetermined temperature. These devices act to open the circuit when a predetermined temperature has been reached and to close the circuit when the temperature has fallen below the desired temperature. Such devices are unsatisfactory because variations in surrounding air currents or ambient temperatures or the type of cooking utensil utilized impair their accuracy.

The present invention aims to overcome the above objections by providing a heating control system having a pair of heating elements, one of which is associated with an adjustable thermostatic switch for selectively varying the average rate of heat emitted therefrom in small increments to adjust the temperature over a wide range, for example, from initial heating temperature of such element, to its maximum heating temperature, the system further having manually operable switch means, preferably associated with the control member for adjusting the thermostat, to connect both of the elements to the supply source and render the thermostatic switch ineffective to govern the power of supply to the element with which it is associated.

My improved system has various advantages among which may be mentioned that like controllers having a single standard current rating may be employed in connection with the several heating units of a cooking range having a variety of ratings; the intermittent connection of the entire electric load of a single large heating unit to the electrical supply current is avoided and thus undesirable fluctuations in the voltage of the supply system is prevented; and the heating elements may be controlled in such manner as to effect economical cooking.

A further object is to provide an electrical heating system which is positive in operation and utilizes a minimum number of parts, is sturdy in construction, is simple and economical to manufacture, and effects a saving of electrical energy.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the accompanying drawings:

Fig. 1 is a top plan view of a thermostatic controlling device adapted to be utilized in my improved system;

Fig. 2 is a side view of the device illustrated in Fig. 1;

Figs. 3A and 3B are isometric exploded views of the device shown in Figs. 1 and 2;

Fig. 4 is a fragmentary perspective view showing the device in assembled position relative to the operating panel of an electric range;

Fig. 5 is a wiring diagram showing several heating units of an electric range controlled by the present apparatus, the heating units being adapted to be operatively connected to a three or four wire electrical supply line;

Fig. 6 is a wiring diagram illustrating a heating unit having a pair of resistance elements electrically connected to a two wire electrical supply line.

Referring to the drawings, in Figs. 1 to 3B, I have shown, for illustrative purposes, a controlling device 11 which may be utilized in my improved system, the same being like that disclosed in my United States Patent No. 2,182,048 issued December 5, 1939. The device has a manually operated knob 12 adjacent a control panel 13 (Fig. 4) at the front wall 14 of the range and secured to a shaft or rod 15 operatively connected to the control device.

The heating unit control device 11 preferably is mounted in a suitable rectangular protected casing 16 (Fig. 4) adapted to shield it from air currents, and heat radiated by the heating unit. The top of the casing may be open and a suitable ventilating screen member 17 may be placed over the top. The casing has a front wall 19 on which there is mounted, but insulated from, a pair of posts 20 and 21, which project forwardly of the wall 19 and serve as terminals for electrical connections 24 and 25 to the heating element which the thermostatic switch is arranged to control, and which element is designated by the letter A' in Fig. 5 and by the letter B' in Fig. 6. The posts 20 and 21 project inwardly from the wall to respectively support and be electrically connected to the forward legs 26 and 27 (Figs. 1 and 2) of composite inverted U-shaped bi-metallic strips 28 and 29. The rear legs 30 and 31 of the composite strips 28 and 29 are interconnected by, but insulated therefrom, a strip 35 providing a relatively fixed support for a thermostatic responsive motor element 36 adapted to deflect and return in response to the flow of electrical current. In the embodiment illustrated, the element 36 is also in the shape of an inverted U with the rear leg 39 thereof secured to, but insulated from, the strip 35 by the rivets 40. The forward leg 41 is free to float forwardly and rearwardly upon changes of temperature in the thermostatic motor element 36. The compensating strips 28 and 29 are equivalent in thermostatic action to the motor element 36 and serve to compensate for variations to the ambient temperatures, for example, surrounding air temperatures; whereby the floating leg 41 of the motor element 36 will always be in the same relative position to the supports 20 and 21 when it is not acting in response to the flow of current. The motor element 36 consists of a relatively wide strip of suitable conducting material subdivided lengthwise, without effecting its stiffness and deflection, into a grid having a plurality of narrow bars 45 (Fig. 1) alternately joined at their opposite ends to form a tortuous path of greater electrical resistance to the heating current than to be offered without the subdivisions. Preferably, an element constructed and supported in the above manner is utilized because the dissipated heat thereof may be readily carried off, though any other suitable element may be used.

The fixed leg 39 of the motor element has a downwardly depending finger 46 which is electrically connected, through a relatively thin copper strip 47, to a depending finger 49 of the compensating strip 28. The amount of current passed through member 28 will be relatively small and insufficient to affect its compensating for ambient temperatures. The forward floating leg 41 of the motor element 36 has a depending finger 50 electrically connected through a copper strip 51 to the depending finger 52 of a plate 54 which is carried by, but insulated from, the motor element leg 41 and in turn carried a contact 55. There is also carried by, but insulated from, the leg 41 of the motor element a U-shaped abutment member 56 having its forward leg 57 in alignment with but spaced forwardly from the contact 55 whereupon, as the free leg 41 of the motor element floats forwardly and rearwardly, it carries therewith the contact 55 and U-shaped abutment member 56 which being fixed relative to one another maintain a set distance therebetween.

Positioned forwardly of the motor element 36 is a snap acting member 60 which carries adjacent its lower end, an electrical contact 61 having a backspacer 62; which contact and spacer are positioned intermediate of the forward leg 57 of the U-shaped member 56 and the contact member 55 of the motor element 36 and when so positioned are interengaged and adapted to cooperate therewith to intermittently open and close the contacts 55 and 61.

The snapping or flexible spring element 60 has a plurality of inherent curvatures about different axes and is adapted to snap from one position of stability to another and, as illustrated, is provided with a central aperture 63 through which depends a supporting tongue 65 (Fig. 2). The tongue 65 in turn is mounted on the inner end of a post 66 which is secured to the front wall 19 of the heating unit casing, thereby providing a fixed center about which the snap spring may be flexed.

The inherent curvature of the snap acting spring relative to its support on the post 66 may be varied by rotation of the manual operable knob 12 as about to be described. Preferably, the shaft 15 is threaded for rotation into the front wall 19 of the heat controlling device casing and its inner end is provided with an abutment 70 of insulating material adapted to engage the snap spring. The shaft 15 is so supported that its abutment 70 is offset from the center of the snap acting spring, preferably above the center, so that upon rotation of the knob, the shaft may be moved inwardly and outwardly and the abutment 70 varies the strain upon the spring 60, thereby flexing it relative to its fixed center and changing the inherent curvature thereof. By varying the point to which the spring will flex from one position of stability to another, the ratio of the time during which the contacts are open, in each cycle of operation, is adjusted.

The outer end of the post 66 for the spring 60 is electrically connected to a source of power, and, when the spring is flexed to a position of stability where the contacts 55 and 61 are closed, the current will flow from the post 66 through spring 60 and through the closed contacts 55 and 61 to the motor element 36 then through the compensating strip 28 and post 20 to the heating unit connection 24. The circuit for the heating unit is completed through post 21 which is provided with an inwardly projecting member 72 adapted to be engaged by the auxiliary contact at the lower end of an arm 74, which arm is supported at its upper end by the inner end of a terminal or post 75. The post 75 is supported on, but insulated from, the wall 19 and has its outer end connected to the source of power.

The operation of the switch arm 74 is also controlled through the shaft 15 which carries thereon a disc 76 of suitable insulating material which is secured to the shaft by a lock-nut 77. The disc 76 has a projecting arm 79 adapted to engage an inwardly projecting ear 80 of the contact arm 74 to move the contact arm to open position and the ear is adapted to exert pressure on the arm 79 to hold it at its limit of travel thereby serving to secure the shaft 15 in position.

The knob 12, at the forward or outer end of the shaft 15 is provided with a pointer 81 cooperating with indicia on the control panel 13 to give a visual indication of the setting of the controlling device. For example, when the knob pointer is aligned with the "off" position 84 on the panel, the arm 79 will engage and hold the switch arm 74 in open position and the abutment 70 will so bear against the spring 60 that it is in the position shown in Fig. 1, with contacts 55 and 61 open and spaced apart approximately twenty-thousandths of an inch. This spacing has been found desirable if the device is to be used on alternating current. Upon rotation of the shaft 15 to the "on" position 85, the arm 79 will initially allow the closing of the switch arm 74 to complete one connection to the heating unit and the abutment 70 will then place the spring 60 under sufficient strain to cause it to snap over dead center from one position of stability to another and close contacts 55 and 61 thereby completing the other connection to the heating unit.

As the motor element 36 becomes heated due to the current flowing therethrough, the forward leg 41 thereof, will move forwardly with the contacts 55 and 61 in wiping engagement until the spring 60 is again flexed over dead center and into engagement with the abutment member 56. The circuit will then remain broken until the motor element 36 cools and the abutment member 56 is carried rearwardly to a point where the spring 60 again flexes to cause the contacts 55 and 61 to engage.

The amount of time elapsed between the opening and closing of the contacts 55 and 61 may be selectively varied in small increments by further rotation of the knob 12 in a clockwise direction to cause the abutment 70 to increase the strain to which the spring 60 is subjected. As the knob is rotated in a clockwise direction and the strain is gradually increased, the contacts 55 and 61 remain closed for a longer period of time while the motor element 36 deflects to meet the new dead center position of the snap spring 60 at which time the cycle of alternate opening and closing of the contacts 55 and 61 is resumed. As pressure on the upper end of the snap spring 60 is increased by inward movement of the abutment 70 the lower end of the snap spring carrying the contact member 61 is moved outwardly towards the forward leg 57 of the abutment member 29 to establish tension in the spring 60 tending to shorten the total time cycle of operation. For example, when the knob pointer is advanced to substantially the midpoint between "on" and "off," the cycles of operation are shortest in over-all time. When the abutment 70 on the shaft is advanced beyond the dead center position of the snap spring the operating cycles again increase in total duration with the "on" portions of the cycle becoming longer and the "off" portions shorter until a point is reached where the strain on the spring prevents deflection thereof by the leg 41 during continuous flow of current through the motor. In this manner, there is provided a complete range of control with an infinite number of positions from initial heating to maximum heating capacity of the heating unit.

In order to prevent heat loss through the motor element when the heating unit is operated at its capacity load, there is further provided a cut-out switch. This switch may comprise a second auxiliary contact having a resilient switch arm 87, controlled by the arm 79 on the shaft 15, and electrically connected to the post 66 at its upper end, and having its lower end positioned to engage a member 89 projecting inwardly from the post 20. The arm 79 is adapted to engage the switch arm 87 and close the circuit when the knob pointer is turned to full, and thus short circuit, or shunt, the motor element 36, by establishing a circuit from post 66 through arm 87 to post 20, then to the heating element 10, and from the heating unit to the post 21, and through switch arm 74 to the post 75. The switch arm 87 is also provided with an inwardly projecting ear 90 adapted to engage the arm 79 to hold it in set position. If it is desired to bring the heating unit to a high temperature in a relatively short time, the arm 79 may be turned to full position, thus short circuiting the grid of the motor and having the usual effect of a double pole switch device.

In order to obtain more efficient operation; there may be provided a shield 91 intermediate the grid and the compensating members 28 and 29 to prevent radiation of heat from the grid affecting the compensating members.

Figs. 5 and 6 diagrammatically illustrate the controlling device as being embodied in my improved system. In such instance, as will be seen from these Figs. 5 and 6, the controlling device has an additional auxiliary switch 87' whereby the heating element which is not controlled by the thermostat may be connected to one of the lines of the source of supply. In Fig. 5, an arrangement is shown wherein two surface heating units of an electric range are each provided with a heat controlling device. In this instance, the cut-out switch 74 is omitted, and the controlling devices are shown as each having a shunt switch 87 and an auxiliary switch 87'. In Fig. 6, a two-element heating unit is shown, and the controlling device is shown as having the cut-out switch 74 and the switches 87 and 87'.

Each of the heating units shown in Fig. 5 consist of two individual heating elements, designated as A' and B' in one case and as A' and C' in the other case. It will be observed that the circuit designated as A' in each case is controlled through element 36 of the intermittent heat controller 11 as described. The second and outer circuit, designated variously as B' and C' is not subject to the intermittent heat control described, but remains steadily connected or disconnected to the electric supply circuit depending upon the position of the operating handle and the cam of the switch 87'. It is customary in electric ranges to provide a plurality of sizes of surface heating units, such as 600, 1000, 1200, and 2000 watts, for example. If single circuit heating elements in such variety of ratings were used, the heating currents in the various controller elements 36 would be dissimilar, and it would then be necessary to provide in each electric range a variety of controllers each having a rating, corresponding to the current rating of its controlled heating unit. This condition would impose practical difficulties in stocks of spare parts and in range wiring connections which would be troublesome in practice. In order to avoid this difficulty, and to make possible the use of a controller having one single standard current rating, the heating units have been subdivided in some cases into two circuits, as A'—B' and A'—C', in which case one heating circuit of every heating unit A' draws a like amount of electric current from the electric supply. In this case, the regulating devices 36 can be identical although the total watt capacity of the several heating units may be considerably different, one from the other.

A second advantage in subdividing the heating units into two heating circuits is in the fact that the intermittent connection of the entire electrical load of a single large heating unit to the electrical supply circuit is thereby avoided. Such intermittent connection of a large load would otherwise produce fluctuations in the voltage of some electric supply systems which would cause objectionable flicker of electric lamps also connected to said supply.

Yet another advantage is that in most cooking operations, it is first necessary to apply a maximum of heat to raise the cooking utensil to a boiling or cooking temperature, after which it is necessary only to maintain the same utensil at a boil, which requires a substantial reduction in the amount of heat originally applied. If regulation of heat were made available over the full range of heat from very low heat up to the maximum of heat available from the largest heating unit on the range, it would be possible for careless cooks to allow the control to remain at high intermediate heat adjustments near the maximum heat which would be wasteful of heat and result in uneconomical cooking. In the present system, when the heat is turned down in the largest units, there is an abrupt decrease in heating rate from the maximum available, to approximately that amount which is normally required to maintain continuous cooking in the cooking utensil. The watt ratings of the two circuits in each unit may be selected to meet this requirement to the best advantage.

In Fig. 5, the regulated coil A' occupies a control location within the unregulated coil B' or C'. This arrangement provides for the most economical use of low heat adjustments, since the outer edge of the heating unit will then operate relatively cool, and a greater proportion of the total heat will be transferred through the cooking vessel proper. Another advantage of the arrangement described, is that smaller cooking utensils, normally requiring less total heat for cooking, may be used efficiently over the inner heating circuit, whereas with all older types of surface heating unit control commonly used in electric ranges, the lowest heats have been distributed over the entire heating unit surface, requiring a large utensil for enonomical cooking.

In Fig. 5, one terminal of each heating coil of each heating unit is connected to the N or neutral supply wire, and the opposite terminals of the several units are disposed among the live wires A, B and C in such manner as to diversify the electric load among said wires A, B and C. It will be noted that two circuits are connected to wire A, two other circuits are connected to wire B and the fifth circuit to wire C. The advantage of this arrangement is that the three heating units are connected to different phases of the supply system to prevent overloading.

If desired, the four wire supply system may be operated as a three wire single phase system. This may be accomplished by connecting the wires B and C together, connecting one terminal of the heating units to wire A and connecting the other terminal of the heating unit through the control device to the wires B and C. When the supply line is used in this manner, the wire N may be used as a neutral or ground wire.

Referring now to the embodiment shown in Fig. 6, a heating unit is shown as having an outer element B' adapted to be controlled by the thermostat, and an inner element C' adapted to be connected to the electric supply through the switches 74 and 87'. The switch 74 is in the connection leading to corresponding ends of the heating elements and functions as a line switch. The switch 87 corresponds in operation and function to the switch 87 shown in Figs. 1 and 2; namely, it directly connects the resistance B' to a supply line when the knob 12 is turned to its maximum heat position and thus shunts the thermostat. The centrally located switch 87' may be a duplicate of the switch 87 but is associated with the other resistance C' so as to cut that resistance into circuit when the knob is turned to maximum heat position.

The operation of the arrangement shown in Fig. 6 is briefly as follows: When the parts are in their "off" positions, all supply is interrupted, that is, the control or threaded rod 15 is in backed-off position so that the snap action member 60 maintains an open position and all of the cam operated switches are open. In this position, the pointer of the knob will be pointing downwardly, referring to Fig. 6. Upon turning the control rod from its "off" position, line switch 74 is closed to complete one connection to the heating elements, and the control rod will then place the snap action spring 60 under sufficient strain to cause it to snap over dead center to a closed position where the contacts 55 and 61 engage, thus completing the connection through the heating element B'. The heating element B' is now under the control of the thermostat, the switch 87 and the switch 87' both being open, and by suitably adjusting the control rod, the time interval during which the thermostatically operated switch remains open and closed may be regulated.

When the control rod is turned to adjacent its full "on" position, shown in Fig. 6, the thermostatic switch 55, 61 is maintained closed because the control rod has reached a point where it will prevent deflection of the spring 60 and thus the thermostatic switch is rendered ineffective to regulate the average power delivered to the resistance B'. At this time, the switch 87 is closed so as to shunt the thermostatic switch and to continuously connect the resistance B' to the supply lines. Furthermore, at about the same time the switch 87 is closed, the switch 87' is closed so that the other resistance C' is now energized whereby both of the resistances simultaneously generate heat in the hot plate to provide a constant maximum heat output to the plate.

From the foregoing description, it will be seen that the present invention provides an improved method and system for controlling electrical heating units adapted for domestic ranges and the like. The average amount of heat is accurately and economically controlled, and an infinite number of adjustments may be made between the initial and the maximum heating capacity of the heating units without substantial loss of electrical energy. The heating units, when set to emit a predetermined average amount of heat are adapted to heat or cook foods more uniformly and preserve their flavor and nutritive value. The system and control devices are simple and inexpensive in construction, can be economically manufactured, and readily installed both in new and existing ranges. The control devices are suitable for any type of electrical supply, are rugged in construction, and can readily withstand any rough usage to which they may be subjected.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a heating system having a pair of heating resistances and an electrical supply source for said resistances, means for controlling said resistances comprising a thermostatically operated timing switch and a master switch, the latter operating through said thermostatically operated switch in a series of positions to connect one only of said resistances to said supply source and in another position to connect both of said resistances to said supply source, said thermostatically operated switch being rendered ineffective to govern the power supply to said resistances when said master switch is in said other position and rendered effective to control the average power supplied to said one resistance when said master switch is in any one of said series of positions and supply different average powers to said one resistance for each of said series of positions.

2. An electric hot plate heating system comprising a pair of heating resistances, an energizing circuit for said resistances, first and second switches, a thermostat connected to said first switch to operate it between its opened and closed positions, a manually operable control member connected to said thermostat and to said second switch operating when moved from an "off" position to cause said thermostat to operate said first switch to close to energize one of said resistances, while said second switch remains in its open position so that said other resistance remains de-energized, means for heating said thermostat controlled by said first switch so as to apply heat to said thermostat when said switch is closed to raise the temperature of said thermostat to cause it to operate said first switch to its open position in a timed interval, whereupon it shuts off the heat from said thermostat to permit to cool to return said first switch to its closed position in a timed interval to reenergize said one resistance, whereby the average power supplied to said one resistance is regulated, said manually operable control member controlling said thermostat when operated through a predetermined range of movement beyond said "off" position to vary said timed intervals and thereby said average power supplied to said one resistance, and when operated to a position beyond said range to control said thermostat to maintain said first switch in its closed position irrespective of the operation of said heating means so that said one resistance is continuously energized, and also when operated to said position said control member operates said second switch to its closed position to energize the other of said resistances, whereby both of said resistances simultaneously generate heat in said hot plate to provide a constant maximum heat output to said plate.

WILLIAM B. ELMER.